(12) United States Patent
Fitch et al.

(10) Patent No.: US 7,147,162 B2
(45) Date of Patent: Dec. 12, 2006

(54) HOUSING FOR AN OPTICAL READER

(75) Inventors: Timothy R. Fitch, Syracuse, NY (US); Gerard F. Beckhusen, Liverpool, NY (US); Eric Coleman, Liverpool, NY (US); John C. Izzo, Auburn, NY (US); Larry Ramsey-Macomber, Fairport, NY (US); Clayton Roberts, Tully, NY (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 128 days.

(21) Appl. No.: 10/339,275

(22) Filed: Jan. 9, 2003

(65) Prior Publication Data

US 2004/0134990 A1 Jul. 15, 2004

(51) Int. Cl.
*G06K 7/10* (2006.01)

(52) U.S. Cl. .......................... 235/472.01; 235/462.45; 235/462.43; 235/462.44; 235/454

(58) Field of Classification Search ........... 235/472.01, 235/462.43, 462.45, 462.44, 454; D14/426–428, D14/420, 431
See application file for complete search history.

(56) References Cited

U.S. PATENT DOCUMENTS

| 4,165,554 | A | | 8/1979 | Faget |
| D293,795 | S | * | 1/1988 | Yamamoto .................. D14/428 |
| 4,818,847 | A | * | 4/1989 | Hara et al. .................. 235/455 |
| 4,818,856 | A | * | 4/1989 | Matsushima et al. .. 235/462.45 |
| 4,825,057 | A | | 4/1989 | Swartz et al. |
| 4,930,848 | A | * | 6/1990 | Knowles ..................... 359/214 |
| D317,154 | S | | 5/1991 | Allgeier |
| 5,092,793 | A | | 3/1992 | Stephan |
| D343,170 | S | | 1/1994 | Gilpin et al. |
| D344,501 | S | | 2/1994 | Gong et al. |
| 5,335,170 | A | | 8/1994 | Petteruti et al. |
| 5,349,497 | A | | 9/1994 | Hanson et al. |
| 5,378,882 | A | | 1/1995 | Gong et al. |
| 5,410,141 | A | | 4/1995 | Koenck et al. |

(Continued)

*Primary Examiner*—Michael G. Lee
*Assistant Examiner*—Kimberly D. Nguyen
(74) *Attorney, Agent, or Firm*—Wall Marjama & Bilinski; Richard A. Romanchik

(57) ABSTRACT

A body portion of an optical reader has an elastomeric skirt surrounding the lateral edges thereof. The laterally spaced front edges of the skirt, which are on either side of a window through which the light is emitted and received along an optical axis, are angled rearwardly from a plane normal to the axis. The front edges extend downwardly and forwardly from a front edge of the bottom wall of a body, and also extend forwardly from a front edge of the top wall of the body. These features allow the lower ends of the front edges of the skirt to be placed on a surface near the target to act as a fulcrum in rotating the handle of the scanner to selectively place the reader in close proximity to the target, while at the same time allowing the operator to view the target. An elastomeric collar is applied to the lower end of the handle such that when the scanning device is placed at rest in an unused condition, no matter what the rotational position with respect to the axis of the handle, the device will be supported at one elastomeric covered position on each of the handle and the skirt. Other features of the scanning device provide for a stable parking of the scanner when not in use and a substantial recessing of the front window to thereby protect it from contact with objects that may tend to scratch or damage the window.

9 Claims, 15 Drawing Sheets

U.S. PATENT DOCUMENTS

| | | | |
|---|---|---|---|
| 5,477,044 A | 12/1995 | Aragon | |
| D374,869 S | 10/1996 | Karlin | |
| 5,569,902 A * | 10/1996 | Wood et al. | 235/462.48 |
| 5,572,007 A | 11/1996 | Aragon et al. | |
| 5,589,679 A | 12/1996 | Dvorkis et al. | |
| 5,594,232 A | 1/1997 | Giordano | |
| 5,598,082 A | 1/1997 | Gilpin et al. | |
| 5,600,121 A | 2/1997 | Kahn et al. | |
| 5,656,803 A * | 8/1997 | Seo | 235/472.01 |
| D387,752 S | 12/1997 | Stewart et al. | |
| D387,753 S | 12/1997 | Stewart et al. | |
| D387,754 S | 12/1997 | Stewart et al. | |
| D388,076 S | 12/1997 | Swift et al. | |
| 5,729,003 A | 3/1998 | Briggs, III | |
| 5,828,052 A * | 10/1998 | Reynolds et al. | 235/472.01 |
| D405,077 S | 2/1999 | Urushihata et al. | |
| D406,126 S * | 2/1999 | Massieu et al. | D14/428 |
| D412,163 S | 7/1999 | Evers et al. | |
| D414,171 S | 9/1999 | Swift et al. | |
| 5,969,326 A | 10/1999 | Ogami | |
| 5,969,328 A | 10/1999 | Kunert | |
| 5,979,770 A | 11/1999 | Schlieffers et al. | |
| D417,445 S | 12/1999 | Chacon et al. | |
| D418,500 S | 1/2000 | Giordano et al. | |
| 6,036,096 A * | 3/2000 | Evers et al. | 235/472.01 |
| 6,056,199 A | 5/2000 | Wiklof et al. | |
| 6,095,422 A | 8/2000 | Ogami | |
| 6,102,266 A | 8/2000 | Chacon et al. | |
| 6,109,528 A | 8/2000 | Kunert et al. | |
| 6,123,265 A | 9/2000 | Schlieffers et al. | |
| 6,131,815 A | 10/2000 | Zigler | |
| 6,149,063 A | 11/2000 | Reynolds et al. | |
| 6,158,661 A | 12/2000 | Chadima, Jr. et al. | |
| 6,164,545 A | 12/2000 | Danielson | |
| 6,244,513 B1 | 6/2001 | Schlieffers et al. | |
| D456,808 S | 5/2002 | Fitch et al. | |
| D456,809 S | 5/2002 | Schlieffers | |
| D456,810 S | 5/2002 | Schlieffers | |
| D458,265 S | 6/2002 | Fitch | |
| D459,728 S | 7/2002 | Roberts et al. | |
| D461,189 S | 8/2002 | Bontly et al. | |
| D462,964 S | 9/2002 | Croley et al. | |
| D464,969 S | 10/2002 | Byun et al. | |
| 6,502,754 B1 | 1/2003 | Bhatia et al. | |
| D470,145 S | 2/2003 | Schlieffers et al. | |
| D470,497 S * | 2/2003 | Byun et al. | D14/426 |
| 6,607,132 B1 * | 8/2003 | Dvorkis et al. | 235/462.43 |
| 6,837,435 B1 | 1/2005 | Kehoe et al. | |
| 6,883,713 B1 * | 4/2005 | Schlieffers | 235/472.01 |
| 2002/0099894 A1 | 7/2002 | Kehoe et al. | |
| 2002/0099895 A1 | 7/2002 | Landron et al. | |
| 2002/0148902 A1 * | 10/2002 | Schlieffers | 235/472.01 |
| 2003/0116631 A1 | 6/2003 | Salvato et al. | |

* cited by examiner

HOUSING FOR AN OPTICAL READER

CROSS REFERENCE TO RELATED APPLICATIONS

This application is related to the applications enumerated below, all of which are being filed with the United States Patent and Trademark Office contemporaneously herewith on Jan. 9, 2003 by Express Mail, and all of which are subject to assignment to the same assignee of this application, the disclosure of each of which is incorporated herein by reference in its entirety: "Optical Reader System Comprising Digital Circuit" assigned U.S. patent application Ser. No. 10/339,424 (Abandoned), entitled "Analog-to-Digital Converter with Automatic Range and Sensitivity Adjustment" assigned U.S. patent application Ser. No. 10/339,004 (Abandoned), entitled "Decoder Board for an Optical Reader Utilizing a Plurality of Imaging Modules" assigned U. S. patent application Ser. No. 10/339,439 (Pending), entitled "Manufacturing Methods for a Decoder Board for an Optical Reader Utilizing a Plurality of Imaging Formats" assigned U.S. patent application Ser. No. 10/339,061 (Abandoned), entitled "Optical Reader Having Position Responsive Decode Launch Circuit" assigned U.S. patent application Ser. No. 10/339,281 (Abandoned).

FIELD OF THE INVENTION

This invention relates generally to optical readers, and more specifically to a housing therefor.

BACKGROUND OF THE INVENTION

In the use of optical reader devices of the type for reading bar codes, the preferred distance in which the reader is placed over and spaced from the bar code varies with the particular code type and also with particular type of reader. It is generally understood that the accuracy and reliability is improved as the reader is brought closer to the code to be scanned. Ideally, it is therefore desirable to be able to position the face of the reader in very close proximity to the code. But in doing so, it is also desirable that the operator be able to see the code. That is, just prior to the read being taken, the operator should be able to see the aiming line of the imager on the target in order to best align the reader with the target.

With existing optical readers, the operators view is generally obstructed when the reader is brought into close proximity to the code. That is, because the front face of the reader is generally angled forwardly of a plane that is normal to the optical axis, the target is substantially covered up as the reader face is brought into close contact with the target.

Another problem associated with optical readers is the tendency of the window to become scratched because of its prominent position at the front face of the reader. Damage can occur to the window during the normal course of scanning as the window comes in contact with the product being scanned, or it can occur during periods of non-use when the scanner is simply at rest on the counter, for example. In any case, any such scuffing or scratching damage to the window may cause for less reliable or improper readings and may necessitate the replacement of the window.

Another thing that maybe affect the reliability and durability of the reader is the shock that may occur from repeatedly setting it down on the counter and/or dropping it from time to time. Although the casings are generally made from a material that is durable enough to withstand the dropping of a unit on a hard surface, the sensitive internal components, and even the outer casing, may be damaged by such treatment.

It is therefore the object of the present invention to provide an improved housing for an optical reader device.

Another object of the present invention is the provision in an optical reader device for improved reliability in the scanning of targets at close proximity.

Yet another object of the present invention is the provision in an optical reader device for allowing the operator to see the bar code while it is being scanned at a close distance.

Still another object to the present invention is the provision in an optical reader device for protecting the front window from damage.

Yet another object to the present invention is the provision in an optical reader for efficiently and effectively lining up the reader with a target when scanning at close distances.

Still another object to the present invention is the provision for reducing damage that can occur to an optical reader by physical contact with hard surfaces.

Still another object to the present invention is the provision for an optical reader device which is economical to manufacture and effective and efficient in use.

These objects and other features and advantages become more readily apparent upon reference to the following description when taken in conjunction with the appended drawings.

SUMMARY OF THE INVENTION

Briefly, in accordance with one aspect of the invention, the front face of an optical reader is angled backwardly from a plane that is normal to the optical axis of the device, thereby improving the visibility of the target to the operator as the scan is being made at close distances.

In accordance with another aspect of the invention, the front face of the scanner is constructed to include a pair of downwardly extending legs on the respective ends of the face such that they can be placed in contact with the target surface and act as a fulcrum for rotating the scanner handle upwardly to thereby allow the scanner face to be controllably brought into close proximity to the target.

By yet another aspect of the invention, a central portion of the front face of an optical scanner is recessed to improve the visibility of the target to the operator as the scanner face is brought into close proximity to the target.

In accordance with yet another aspect of the invention, the position of on the front face window of an optical reading device is substantially offset inwardly to protect the window from damage that might otherwise occur.

By still another aspect of the invention, the housing of an optical reader is provided with an elastomeric material surrounding each of its ends such that when it is placed or dropped on a hard surface, it will be cushioned at both ends thereof.

While the present invention has been particularly shown and described with reference to a preferred embodiment as illustrated in the drawings, it will be understood by one skilled in the art that various changes in detail may be effected therein without departing from the spirit and scope of the invention as defined by the claims.

DESCRIPTION OF THE PREFERRED EMBODIMENT

Figure 1:
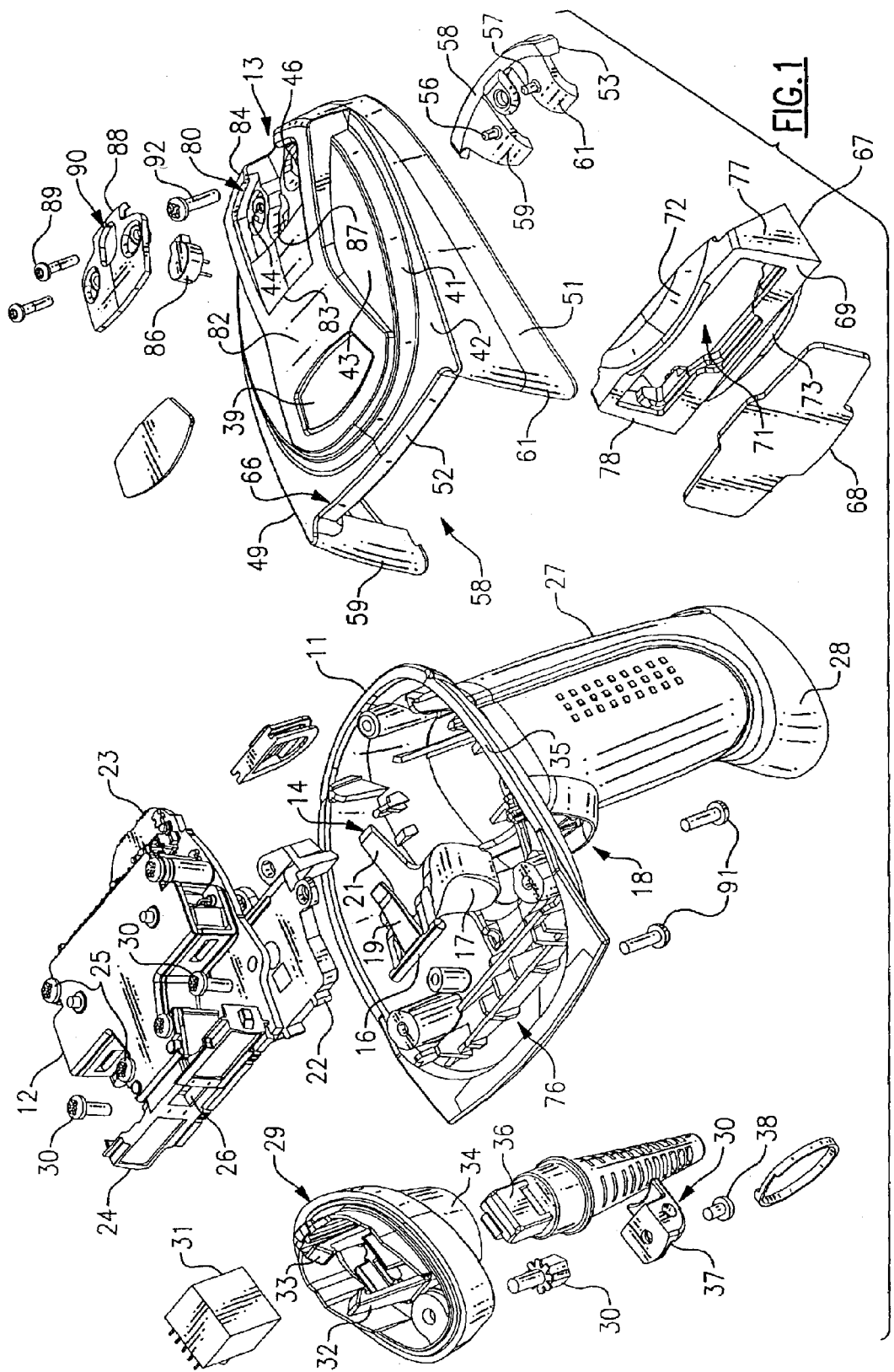
FIG. 1 is an exploded view showing the various components of the optical scanner in accordance with the present invention.

FIG. 1, shows the various components of the optical reader device, including a handle assembly 11, an optics assembly 12 and a housing cover 13.

Contained within an internal cavity 14 of the handle assembly 11, is a trigger assembly 16 with it's trigger 17 loosely extending through a trigger opening 18 such that the trigger 17 can be selectively depressed by the operator. On the upper side of the trigger assembly 16 is a pair of contact members 19 and 21 which, when the trigger is depressed, engage surfaces on the trigger frame 22 mounted thereabove. Disposed immediately above and attached to the trigger frame 22 is a printed circuit board 23 to which the optical assembly 12 is mounted.

The optical assembly 12 has mounted therein a plurality of light emitting diodes which project light forwardly through a lens assembly 24 for the illumination of a target such as a bar code. An optics assembly within the lens assembly 24 then projects an image back through an opening 26 to an image processor which "reads" the bar code. Pending U.S. application Ser. No. 10/137,484 filed on May 2, 2002 (311.01NP), Ser. No. 10/161,950 filed on Jun. 4, 2002 (283__358) and Ser. No. 10/252,484 filed Sep. 23, 2002 (283__355NP), as well as two applications being filed concurrently herewith and titled Decoder Board for an Optical Reader Utilizing a Plurality of Imaging Formats and Optical Reader Having Position Responsive Decode Launch Circuit, respectively, all of which are commonly owned by the Assignee of the present invention and incorporated herein by reference.

The handle assembly 11 includes a downwardly extending handle 27 which terminates with an enlarged portion 28 which extends forwardly in a bulbous fashion as shown. Attached to the enlarged portion 28 is an end cap 29, which is secured thereto by a fastener 30. An electrical flex device 31 is secured between a pair of flexible fingers 33 and 34 in the end cap 29 for purposes of providing electrical power to the various elements within the optical assembly 12 by way of an electrical lead (not shown) extending upwardly through the handle 27.

Insertably installed in the other end 34 of the end cap 29 is an electric plug 36 which acts to bring power to the optics assembly 12 and to transmit signals from the optics assembly 12 to a display device (not shown). The plug is held in place by way of a cord lock 37 which is secured in place by a fastener 38. As will be seen in FIG. 1, the cord lock 37 also includes an opening 30 through which a hook or a lanyard or the like may be inserted for hanging up the unit when not in use.

Referring now to the top portion or body 35, of the handle assembly 11 which together with the housing cover 13, functions to contain the various internal components as described hereinabove, it will be seen that the optical assembly 12 is secured to the printed circuit board 23 by fasteners 25 and the printed circuit board 23, in turn, in secured to the body 35 by fastener 30. Before attaching the housing cover 13 to the body 35, there are various components that are attached to the housing cover 13. Before discussing any of the attachments however, it is best to first describe the housing cover 13 in greater detail.

The housing cover 13 is made by a two shot molding process wherein in the first shot, a hard plastic core is formed of a material such as—. In a second shot, a softer thermoplastic elastomer layer is then molded over the plastic core in a rather conventional matter. A suitable material for the outer layer is commercially available under the name of Santoprene, which is sold by Monsanto Chemicals Ltd. One of the primary purposes of the elastomer layer is to provide protection to the hard plastic material, but also to the internal components of the optical reader device by reducing the shock effect when the optical reader device comes in contact with a hard surface. The distribution of the Santoprene material on the various surfaces of the optical reader device is optimized for that purpose as will be more fully described hereinafter.

Referring to the outer layer of the top surface of the housing cover 13 as shown in FIG. 1, the thermoplastic elastomer material is applied to all surfaces except for a recess 39 for applying a label, a rim 41 separating a lower surface 42 from an upper surface 43 of the housing cover 13, fastener openings 44 and 46, and a small area at the rear of the housing cover 13 in which a light-pipe is disposed but not seen in FIG. 1.

Figure 2:
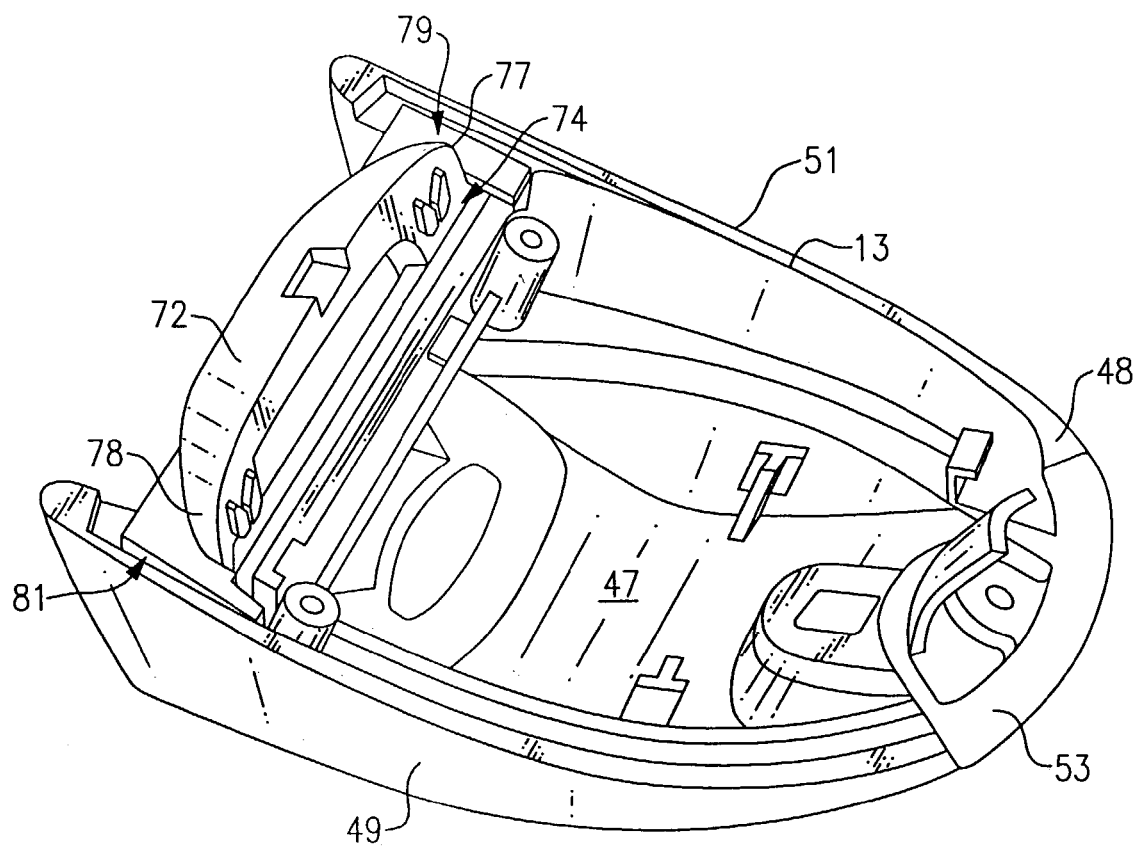
FIG. 2 is a perspective view of the underside of the housing cover in accordance with the present invention.

Referring to FIG. 2, the inside of the housing cover 13 is shown to include the hard plastic core 47, with the thermoplastic elastomer layer 48 covering the sides 49 and 51, as well as the front edge 52. As will be seen, the elastomer layer 48 is discontinuous near of the rear edge, where a lightpipe 53 is installed and secured by pins 56 and 57 that extend into openings in the bottom side of the hard plastic core 47. The lightpipe 53 includes an outer rim 58 which is integrally connected to a pair of inwardly and downwardly extending optical guides 59 and 61 as shown in FIGS. 1 and 2. These guides receive light from respective LEDS on the printed circuit board 23 and transmit light to the respective ends of the rim 57 for display when a "good read" has occurred. This allows the operator to recognize that the bar code has been successfully "read".

Referring now to the forward end of the housing cover 13, the opening 58 is bordered on each side by downwardly and forwardly extending wing structures or forward edges 59 and 61 whose plane is disposed at a particular angle as will be more fully described hereinafter. It will be seen that the sides 49 and 51 taper downwardly as they extend from the back side of the housing cover 13 to the front side thereof. The forward edges 49 and 51 also extend forwardly of the front edge 52 of the lower surface 42 to thereby define an indentation 66 at the front edge 52. This indentation, along with the forward projection of the forward edges 49 and 51, along with the downward tapering of the forward edges 49 and 51 assist in obtaining a desired spacing of the reader from the target, while at the same time allowing the operator to simultaneously observe the target as will be more fully described hereinafter.

The window boot and its included window are shown at 67 and 68, respectively in FIGS. 1 and 2. The window boot 67 is an elastomeric member having a rectangular front face 69 with an opening 71 for receiving the window 68. On its top and bottom sides, there are provided curvilinear gaskets 72 and 73, to be closely received into cavities 74 and 76 of the housing cover 13 and the handle assembly 11, respectively. The elastomeric sides 77 and 78 of the boot 67 fit tightly into the wedge shaped cavities 79 and 81, respectively, of the housing cover 13 as shown in FIG. 2. It should be recognized that because of this particular placement of the boot in the cover 13, the window 68 is recessed substantially rearwardly into the housing cover 13 and well inwardly from the front faces of the wings 59 and 61 to thereby protect it from contact with objects that may tend to scratch or damage the window 68.

Referring now to the top surface of the housing cover 13 as shown in FIG. 1, the central portion 82 is slightly rounded and then as it proceeds toward the rear end of the housing cover 13 it is substantially planar from a front edge 83 to a rear edge 84 behind the recess 80 that is provided for receiving the attached components. Attached within the recess 80 is a beeper 86 which is installed in a central opening 87, and a lanyard plate 88 that is placed over the beeper 11 and secured at the openings 44 and 46 by fasteners 89. The beeper 86 is electrically connected to the circuit board 23 to provide an audible sound to the operator when a "good read" occurs. The lanyard plate is slightly recessed into the recess 80 such that only the elastomeric material on the planar surface surrounding the lanyard plate comes into contact with a surface when the unit is "parked" as will be described hereinafter. The lanyard plate has an opening 90 for accommodating the fastening of a lanyard thereto.

The housing cover 13 is secured to the handle assembly 11 by fasteners 91 that extend upwardly through the handle assembly 11 and into the housing cover 13 and a fastener 92 which passes downwardly through the housing cover 13 into the handle assembly 11 as shown in FIG. 1.

Figure 3:
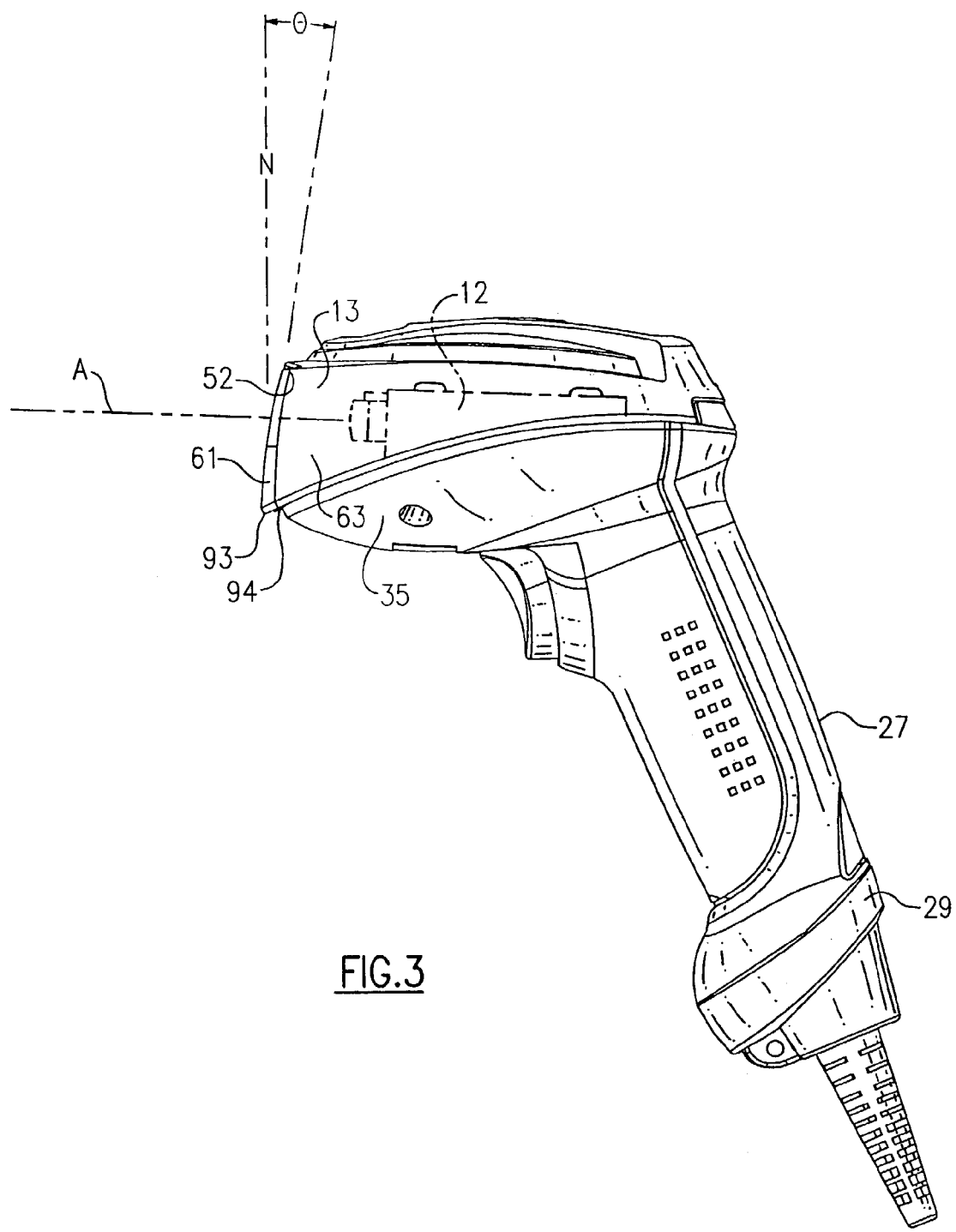
FIG. 3 is a side view of the optical scanner showing the front face orientation in relation to the optical axis.

Referring now to FIG. 3, the optical scanner is shown in a side profile to indicate the placement of the optical assembly 12 therein, as partially contained within the body portion 35 of the handle assembly 11 and the cover 13. The light is projected from the optical assembly 12 and received along an optical axis A. As discussed hereinabove, the particular structure and orientation of the front portion of the cover 13, as shown in profile by the front edge 61, facilities the selective close placement of the reader to the target while, at the same time allowing the operator to continue to observe the target.

It will be seen that the front edge of the wing structure 61 is curvilinear in form (i.e., it is slightly convex outwardly). However, it is generally angled rearwardly from a plane N normal to the optical axis A as shown. For simplicity, a dashed line has been drawn through the tangent of the other surface of that wing structure 61 at the point at which the axis A passes therethrough. It will be recognized that this tangent line is angled rearwardly at an angle θ from the plane normal to the optical axis A. The angle θ should be in the range of 5–10 degrees and is preferably 8 degrees.

It will also be seen that the cover side 63 tapers downwardly as it extends from the rear end of the cover 13 to the front end thereof at 61. The result is that there are a pair of base points 93 (i.e., one on either side), with both formed of the elastomeric material, which extends both downwardly and forwardly from a front edge 94 of the body 35.

As the front face as defined by the edges 59 and 61 extends upwardly, it is angled rearwardly as discussed hereinabove, but it remains as the forwardmost part of the structure such that, even at the top ends of the edges 59 and 61, they project forwardly of a forward edge 52 of the cover/over surface 42 to hereby provide the indentation 66, between the two edges 59 and 61 and the front edge 52 as discussed hereinabove.

Figure 5A:
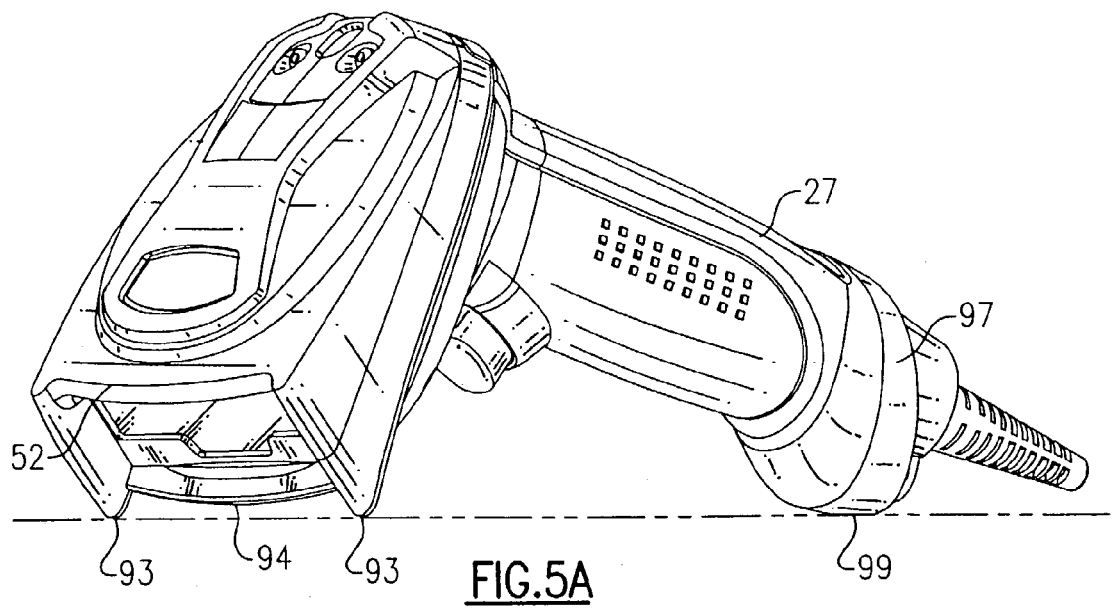
FIGS. 5a–5c show the scanner device in various cushioned positions in accordance with the present invention.

Referring now to FIG. 5a, the above described features of the front face can readily be seen as advantageous to the accomplishment of a controlled and reliable "good read". In operation, the base points 93 are placed on a surface close to the target to be read. The handle 27 can then be rotated upwardly to more closely position the optical assembly 12 to the target with use of the aiming light. In this regard, generally the higher the handle is tipped upwardly, the closer will be the scanner to the target. As this occurs, however, the operator will still be able to see the target because of the unobstructed visual pathway in the vicinity of the edge 52.

Figure 4A:
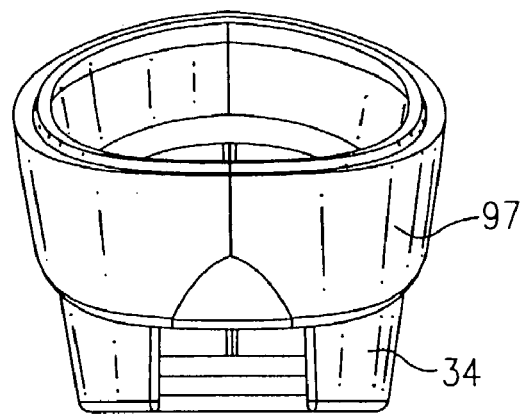
FIGS. 4a–4c are front, side, and sectional views of the end cap portion of the present invention.
Figure 4B:
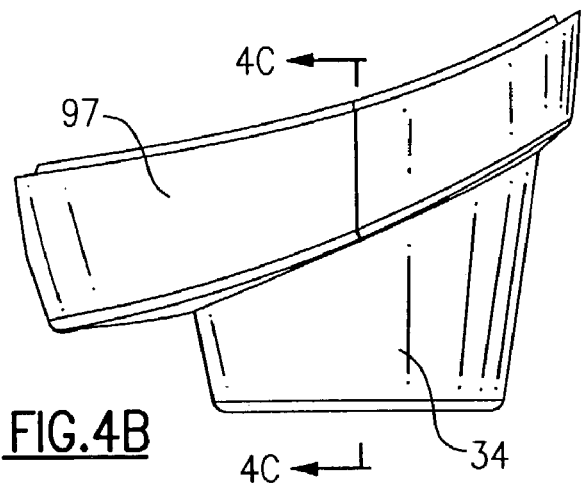
Figure 4C:
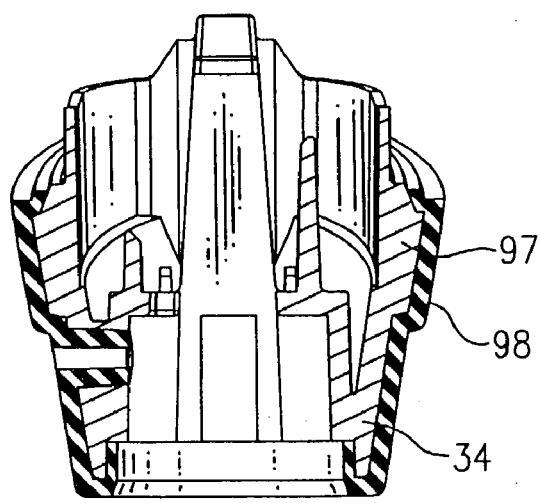

Considering now the cushioning aspects of the present invention, the end cap is shown more fully in FIGS. 4a–4c. The end cap 29 is made up of two portions, the collar portion 97 and the other end or stem portion 34. For purposes of the present invention, it is important that the collar 97 be entirely surrounded by elastomeric material. In the present case, the collar 97 and the stem portion 34 are integrally connected and an elastomeric material is applied to the entire combination as shown at 98. Again, the application of the elastomeric material to an inner core may be accomplished by way of the two shot molding process as discussed hereinabove.

Referring now to 5a–5c, it will be seen that the combination of the elastomeric skirt around the body of the scanner, and the elastomeric collar provides for a cushioning effect to the scanner when it comes into contact with the hard surface. This can occur when the device is simply laid down when not in use, or when it is occasionally dropped by the operator.

Figure 5B:
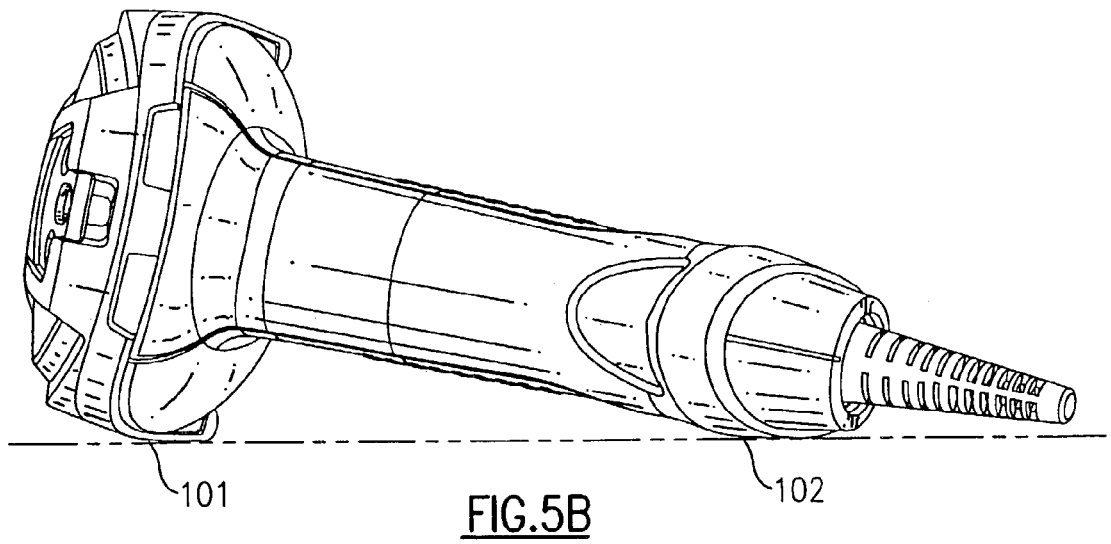
Figure 6A:
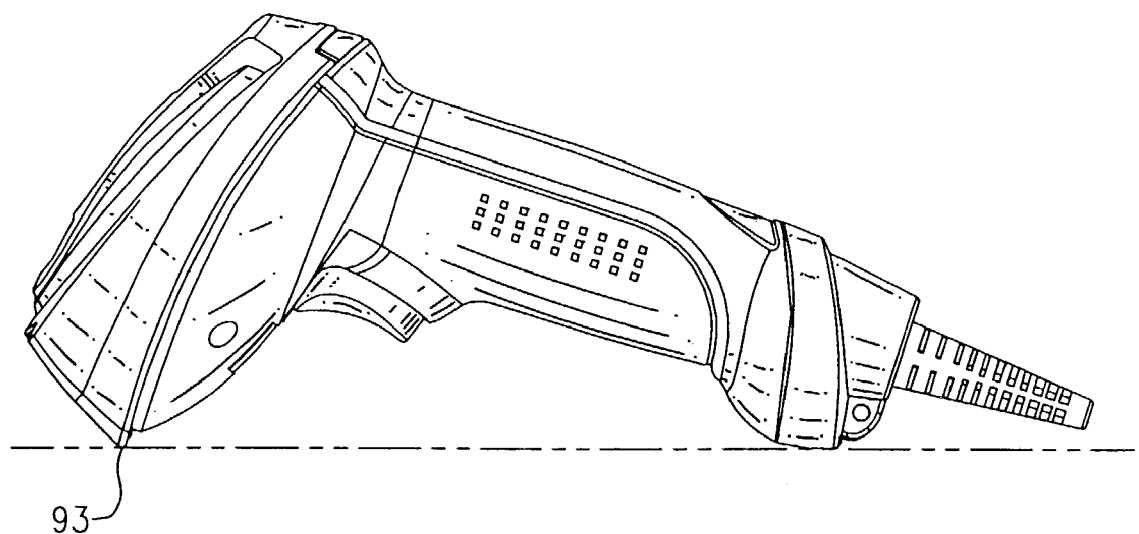
FIGS. 6a–6c show various positions of the scanner device in "parked" positions in accordance with the present invention.

In FIG. 5a, and also in FIG. 6a, the device is in a generally "parked" position wherein it is supported at the points 93 of the skirt and at the front edge 98 of the collar 97 as shown. Here, it is in a stable position and is well cushioned from any shock. Of course, on its way to that position, it may first come into contact with the hard surface at one of the two points 93 or at the point 99 of the collar. In any case, the device is cushioned at one or more of those three points on the way to that "parked" position. In FIG. 5b, the device is shown laying on its side, such that it is supported at two points 101 and 102 on the skirt and the collar, respectively. Again, on the way to that position, it is likely to first come into contact with the hard surface at only one of those two points, but will be cushioned at that time.

Because the skirt extends entirely around the cover, except for a small segment at its rear where the lightpipe is installed as discussed hereinabove, and because the collar 97 extends entirely around the end cap 29, the device can be place in any rotational position between those shown in FIGS. 5a and 5b, while it is being supported and cushioned at the two ends of the device.

Figure 5C:
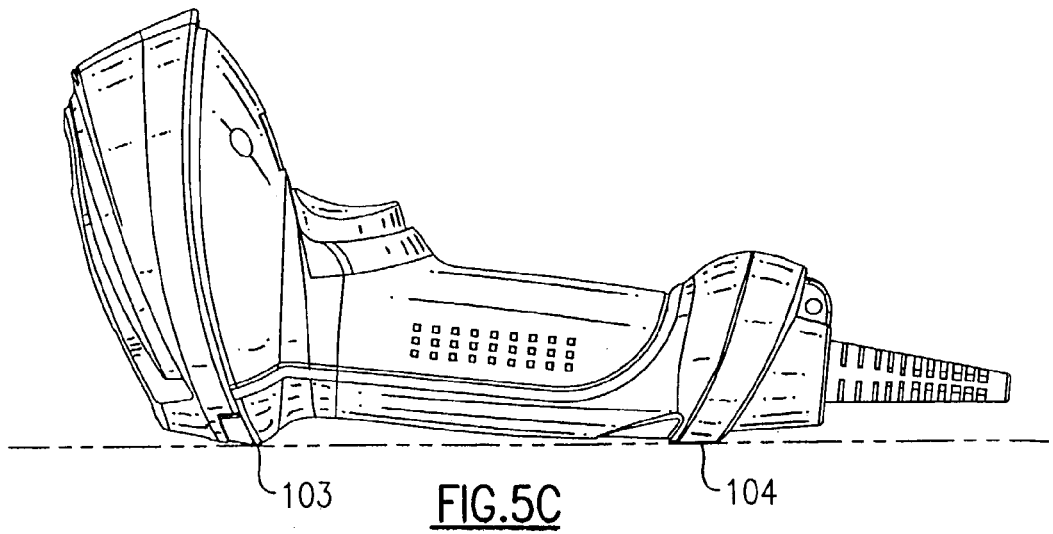

Referring now to FIG. 5c, the scanning device is shown in a position with its backside laying flatly against a hard surface. Here the collar of the end cap will provide a cushioning effect at point 104, but because of the lightpipe structure there is no cushioning effect at the cover end of the device. Instead, the lightpipe structure itself will be in contact with the hard surface at point 103 as shown. It is therefore necessary to ensure that the lightpipe structure and installation is sufficiently robust to withstand any shocks that may result from a dropping of a device in this position.

Considering further now the positions in which the device can be "parked". The forward face down position as shown in FIG. 6*a* has been discussed hereinabove.

Figure 6B:
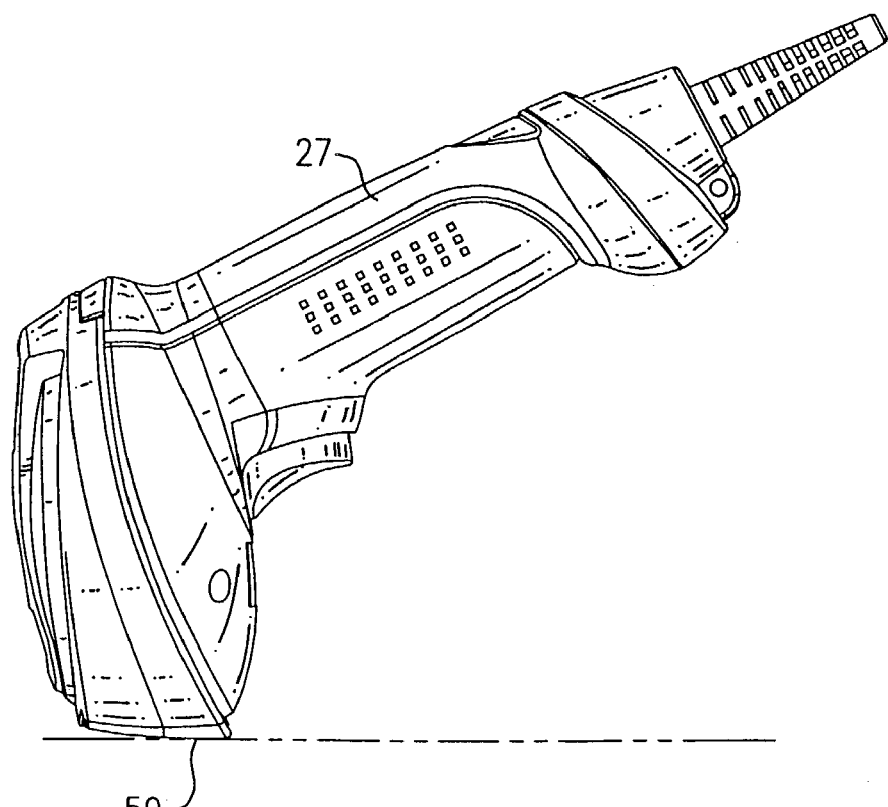

In FIG. 6*b,* the device is shown as parked on its front edges or wings 59 and 61. Although that front edge is slightly convex outwardly, it is sufficiently close to being planar as to allow for a "parking" in this position so long as the device is appropriately balanced to accommodate this. In the process of such a balancing, it is necessary to consider the weight of the power cord that will tend to weight down the rearward end of the handle 27. However, this can be accomplished if this feature is considered to be sufficiently advantageous.

Figure 6C:
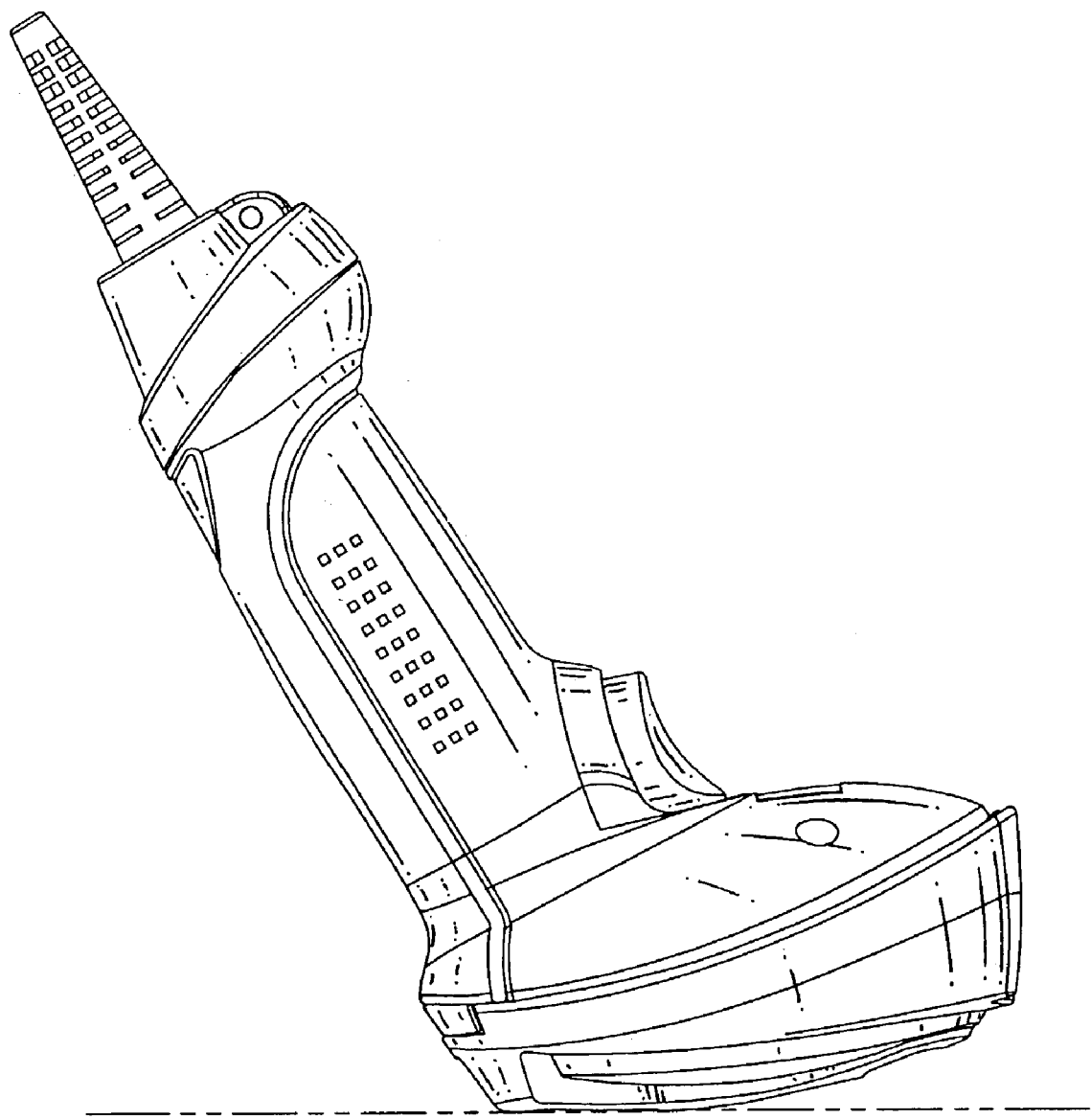
Figure 7:
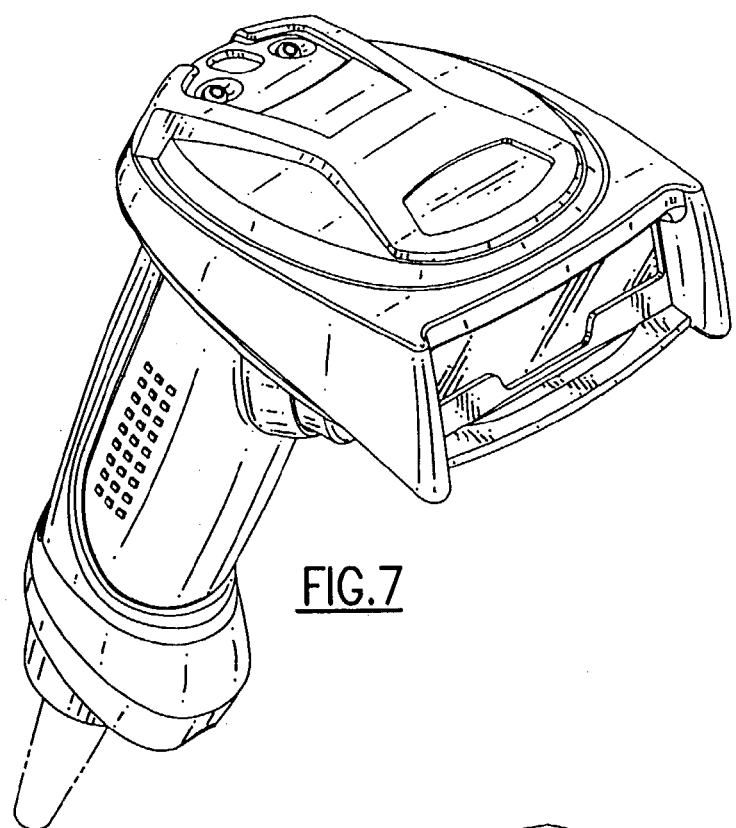
FIGS. 7–13 show various ornamental features of the scanner device in accordance with one embodiment of the present invention.
Figure 8:
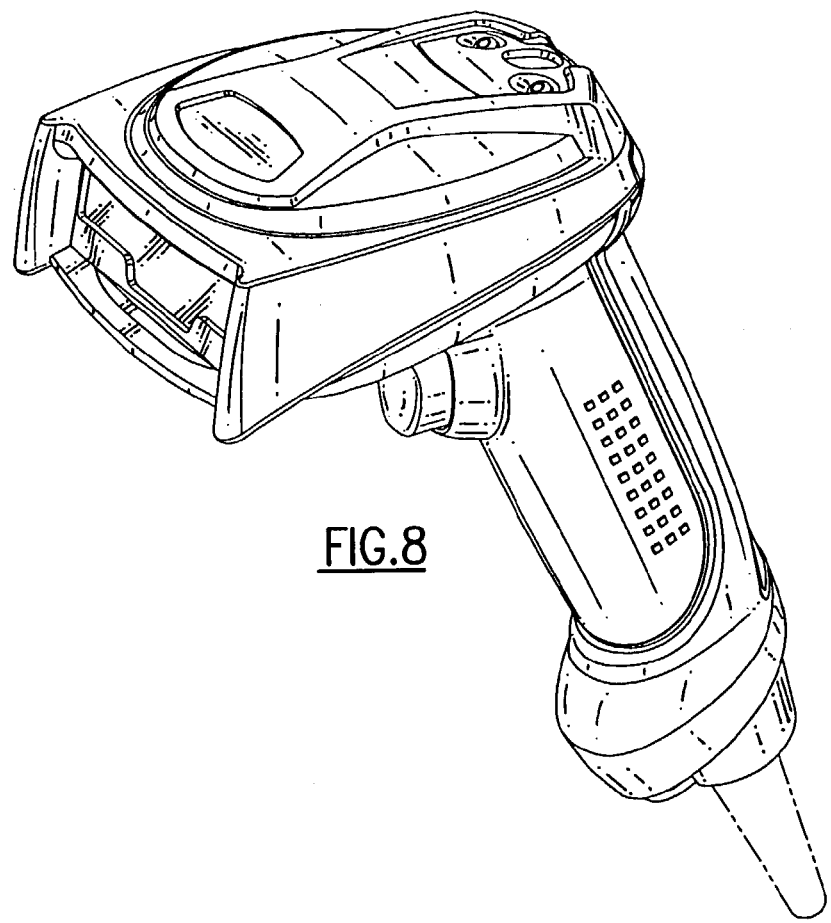
Figure 9:
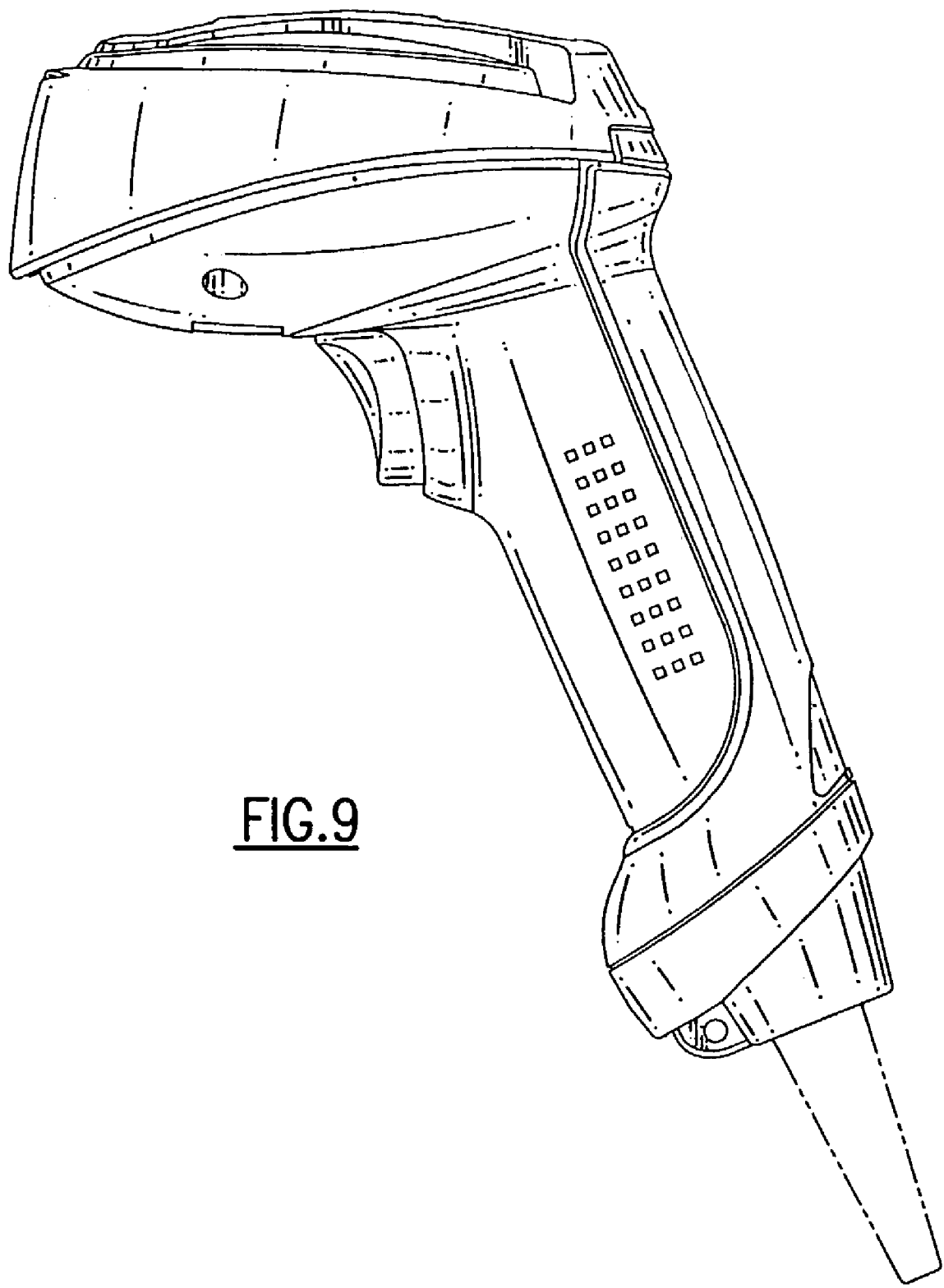
Figure 10:
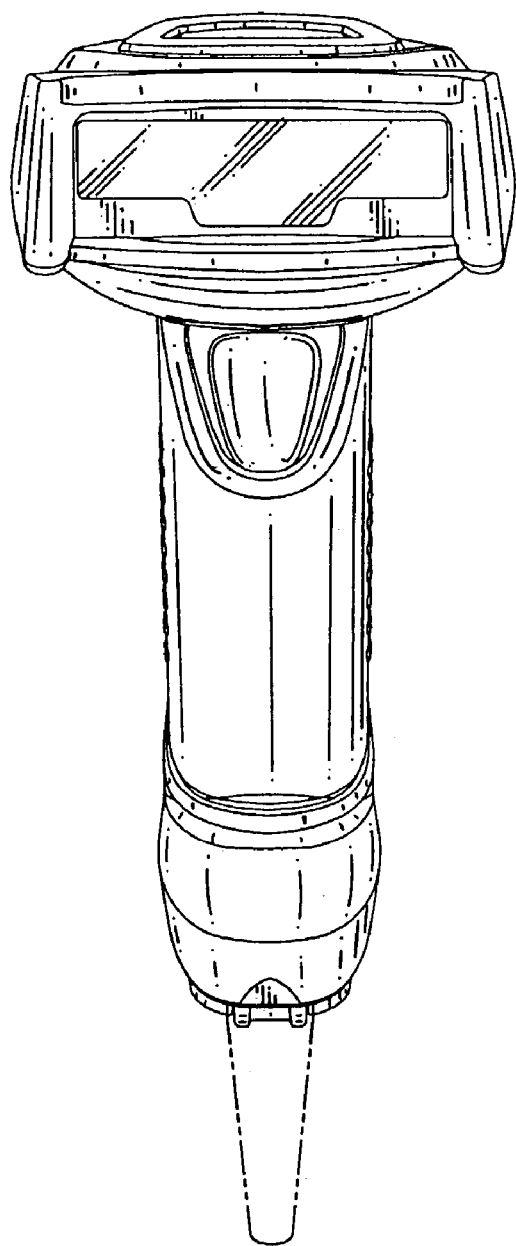
Figure 11:
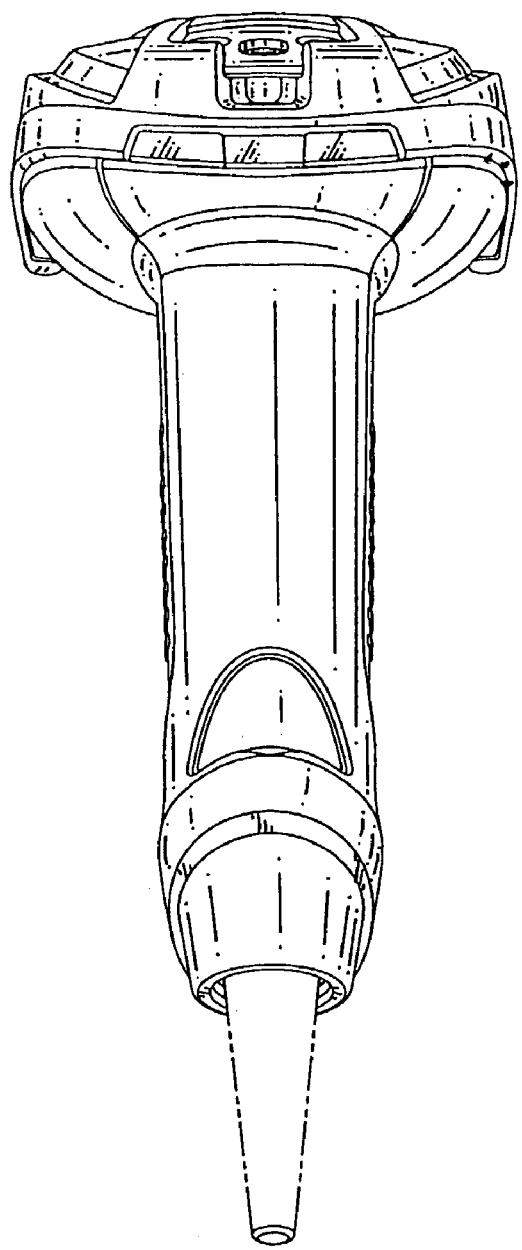
Figure 12:
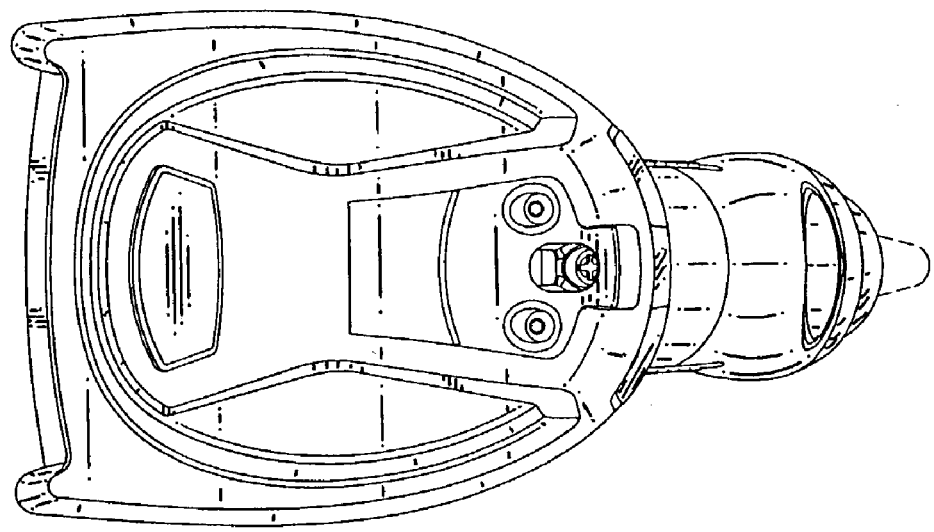
Figure 13:
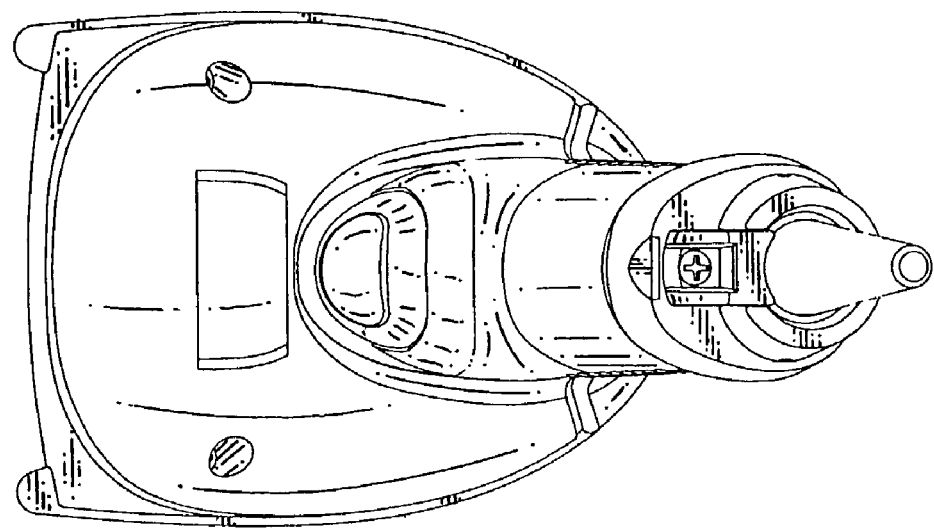
Figure 14:
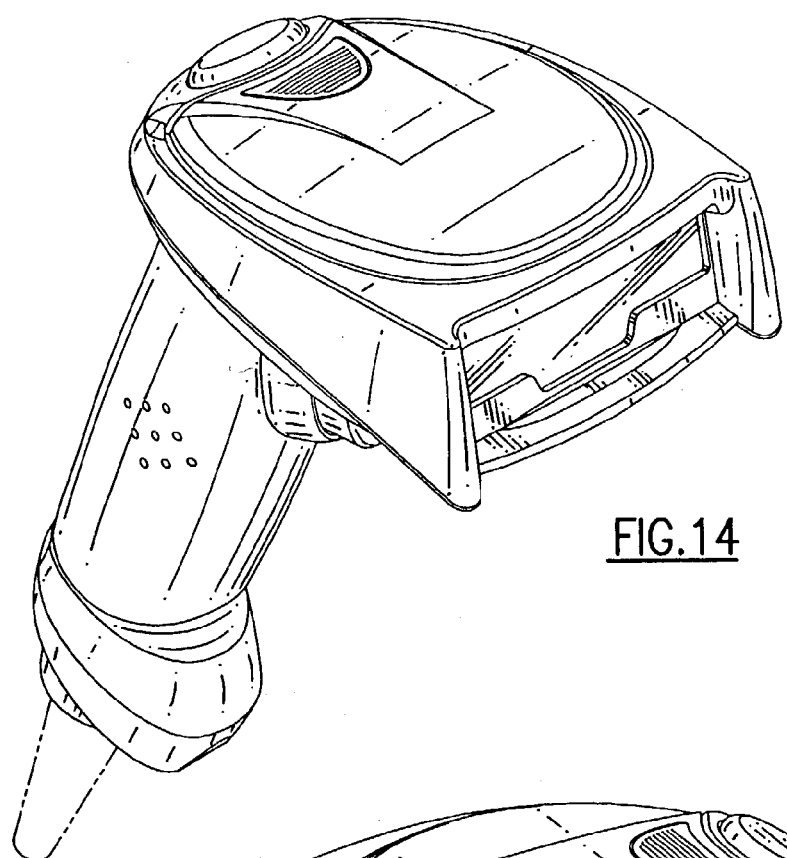
FIGS. 14–20 show various ornamental features of the scanner devices in accordance with another embodiment of the present invention.
Figure 15:
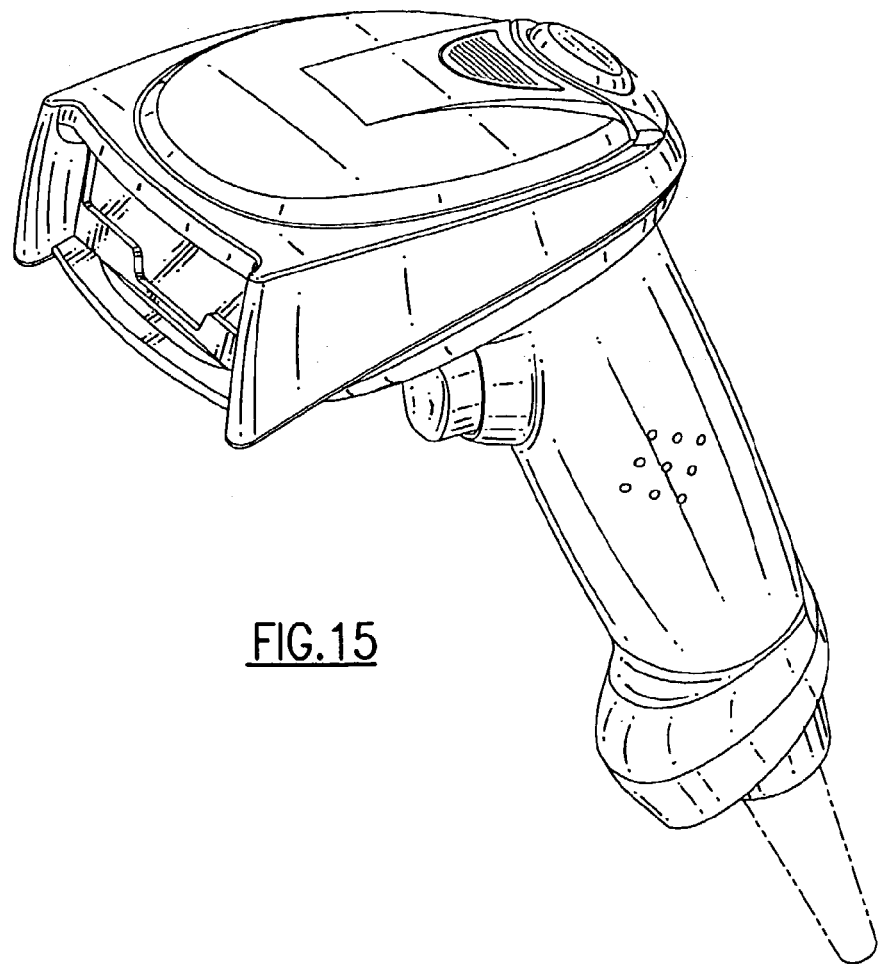
Figure 16:
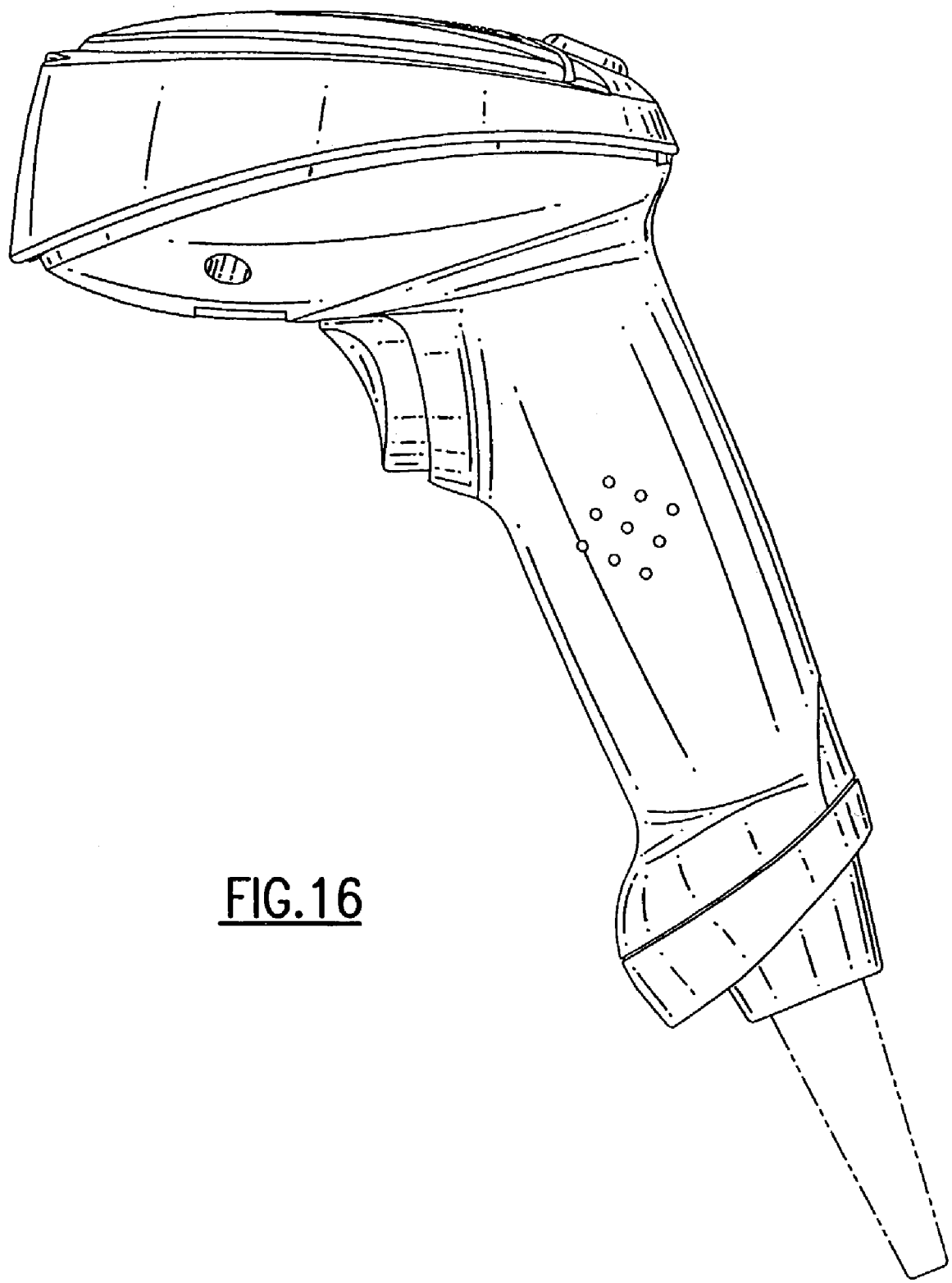
Figure 17:
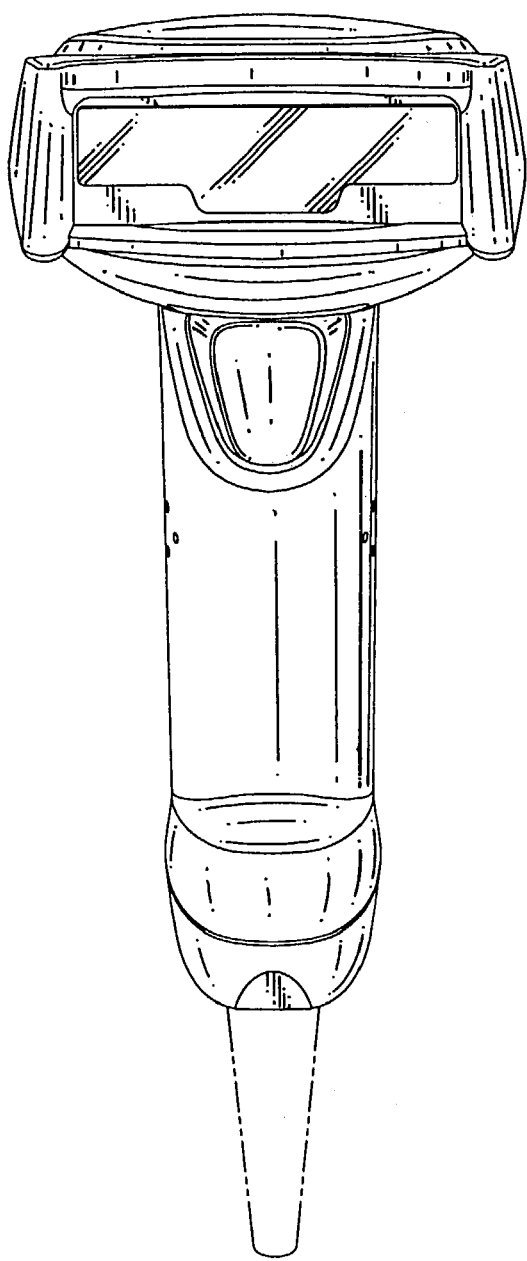
Figure 18:
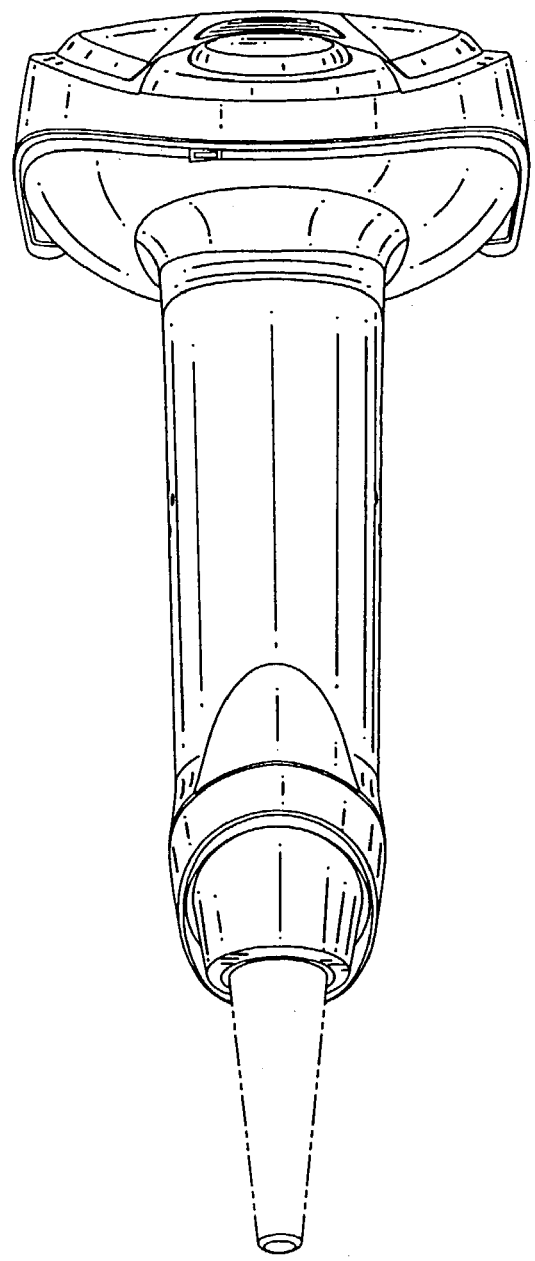
Figure 19:
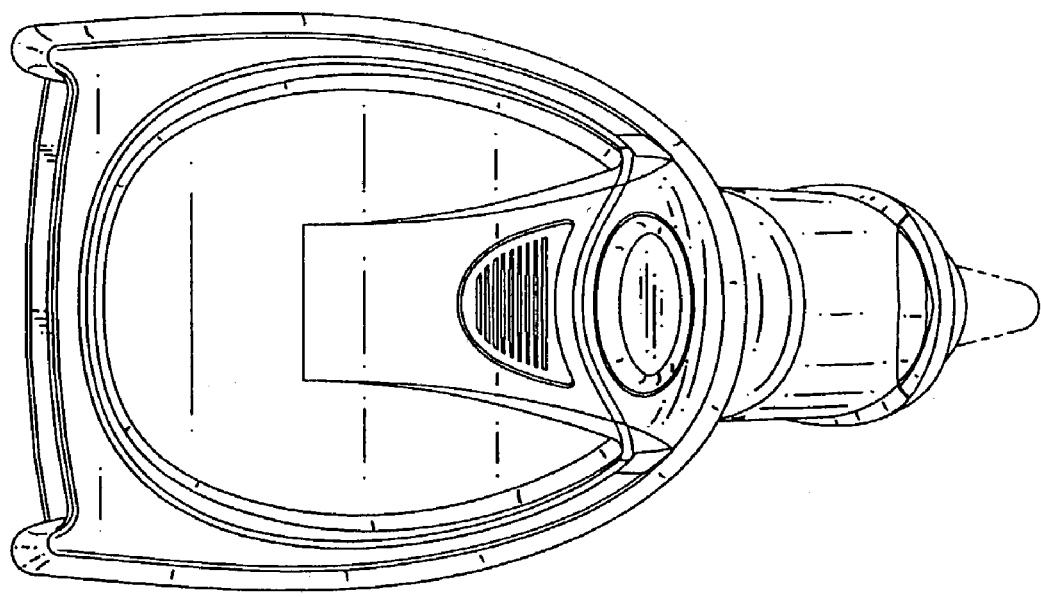
Figure 20:
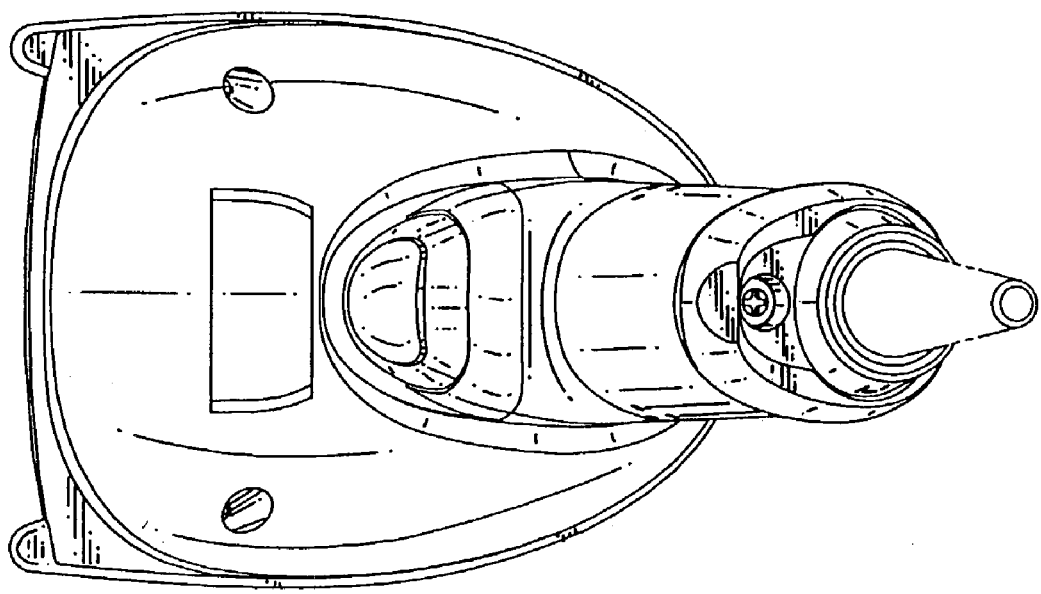

Another possible "parked" position is that shown in FIG. 6*c* wherein the device is placed upside down so as to rest on the planar surface near its rear end as described hereinabove. Again, the weight of the cord tending to pull the rear handle downwardly is a factor but, because the surface is in fact planar, it has been found to be quite stable in this position, even with the weight of the cord.

The various ornamental features of an industrial version of the device are shown in FIGS. 7–13, and those of a commercial version are shown in FIGS. 14–20.

We claim:

1. An optical scanning device of the type having apparatus for emitting light and for receiving light along an optical axis and through a forward window placed in proximity to a target and which is adapted for contact with a planar surface, said optical scanning device comprising:

a handle to be grasped by an operator for selectively positioning the scanning device near the target;

a head connected at one end of said handle and containing the light emitting and receiving apparatus, said head having a front face comprising spaced apart first and second elongated surfaces, each being shaped to be slightly convex outwardly, said scanning device being configured so that said first and second spaced apart elongated surfaces can contact said planar surface simultaneously, said first and second spaced apart elongated surfaces each extending in a direction generally parallel to a plane extending normal to said optical axis but angled rearward from said plane such that lower portions of said first and second elongated surfaces extend more forwardly than upper portions of said first and second surfaces; and wherein said each elongated surface extends downwardly from a front edge of a bottom wall of a body extending there between.

2. An optical scanning device as set forth in claim 1, wherein the angle between each said elongated surface and said plane is the range of 5 to 10 degrees.

3. An optical scanning device as set forth in claim 1, wherein said head has a top surface coated with elastomeric materials.

4. The optical scanning device as set forth in claim 1, wherein said first and second elongated surfaces comprise elastomeric material.

5. An optical scanning device as set forth in claim 1, wherein said each elongated surface extends forwardly of a front edge of a bottom wall of a body extending there between.

6. An optical scanning device as set forth in claim 1, wherein said each elongated surface extend forwardly of a front edge of a top wall of a body extending there between.

7. An optical scanning device as set forth in claim 1, wherein each of said first and second elongated surfaces terminate in a base point.

8. An optical scanning device as set forth in claim 1, wherein each of said first and second elongated surfaces consist of elastomeric material.

9. An optical scanning device as set forth in claim 1, wherein said handle comprises a lower end coated with elastomeric material.

* * * * *